(12) United States Patent
Koumura et al.

(10) Patent No.: US 7,781,923 B2
(45) Date of Patent: Aug. 24, 2010

(54) AC GENERATOR FOR A VEHICLE

(75) Inventors: Masatoshi Koumura, Okazaki (JP); Yoshiki Tan, Anjo (JP); Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 420 days.

(21) Appl. No.: 11/892,881

(22) Filed: Aug. 28, 2007

(65) Prior Publication Data

US 2008/0061636 A1    Mar. 13, 2008

(30) Foreign Application Priority Data

Sep. 7, 2006    (JP) .............................. 2006-242916

(51) Int. Cl.
*H02K 1/32* (2006.01)
(52) U.S. Cl. .......................................... 310/43; 310/64
(58) Field of Classification Search .................. 310/43, 310/52, 54, 58, 64
See application file for complete search history.

(56) References Cited

U.S. PATENT DOCUMENTS

| | | | |
|---|---|---|---|
| 5,949,166 A | 9/1999 | Ooiwa et al. | |
| 6,184,602 B1 | 2/2001 | Ooiwa et al. | |
| 6,734,587 B2 | 5/2004 | Hirsou et al. | |
| 6,798,094 B2 | 9/2004 | Hirsou et al. | |
| 6,809,443 B2 | 10/2004 | Nakamura et al. | |
| 6,903,472 B2 * | 6/2005 | Ogi ........................... | 310/68 D |
| 6,933,635 B2 * | 8/2005 | Kurahashi .................. | 310/68 D |
| 7,414,339 B2 * | 8/2008 | Kitamura et al. .......... | 310/68 D |

FOREIGN PATENT DOCUMENTS

| | | |
|---|---|---|
| JP | U-2-88459 | 7/1990 |
| JP | A 11-164538 | 6/1999 |
| JP | A-2004-112860 | 4/2004 |
| JP | A-2004-520797 | 7/2004 |
| JP | A-2004-274992 | 9/2004 |

OTHER PUBLICATIONS

Foreign Office Action with English Translation, dispatched Jul. 2, 2009.

* cited by examiner

*Primary Examiner*—Nguyen N Hanh
(74) *Attorney, Agent, or Firm*—Oliff & Berridge, PLC

(57) ABSTRACT

In an AC generator for a vehicle, an end cover has two types of parts, one-type part is away from a rib part in a positive cooling fin, and the other-type part is close to the rib part. The rib part projects toward the end cover side. The one-type part is thinner than the other-type part in the end cover in order to reduce the variation of thermal expansion in each part of the end cover. This configuration increases anti-thermal fatigue of the end cover.

6 Claims, 5 Drawing Sheets

INSIDE ← → OUTSIDE
AXIAL DIRECTION

COOLING
AIR

INSIDE ←——→ OUTSIDE

AXIAL DIRECTION

AC GENERATOR FOR A VEHICLE

CROSS-REFERENCE TO RELATED APPLICATION

This application is related to and claims priority from Japanese Patent Application No. 2006-242916 filed on Sep. 7, 2006, the contents of which are hereby incorporated by reference.

BACKGROUND OF THE INVENTION

1. Field of the Invention

The present invention relates to an AC generator (or a vehicular alternator) for a vehicle, in particular, relates to a vehicular alternator equipped with a resin end cover (hereinafter, referred to as "an end cover" in short) covering electrical components attached to an outer end surface of a frame.

2. Description of the Related Art

For example, Japanese patent laid open publication No. JP H11-164538 has disclosed an AC generator having a configuration in which an end cover covers a rectifier device to an outer end surface of a frame. The end cover has a cooling window through which cooling air flows from the outside of the AC generator into the inside thereof in order to cool the rectifier device. The rectifier device has cooling fins to which the rectifier elements are fixed and by which the rectifier elements are cooled. Each cooling fin has a plate part and a rib part. The plate part of the cooling fin extends towards approximately a radius direction while facing the end cover. The rib part of the cooling fin protrudes from the plate part towards the end cover. Because the presence of the rib part can increase a thermal discharge area of the cooling fin, and suppress the increase of a temperature-rise at the cooling fin.

A recent trend to decrease a size of an AC generator for a vehicle requires decreasing a gap between the cooling fins of the rectifier device and the end cover which covers the rectifier device, in more detail, requires decreasing a gap between the rib part of the cooling fins and the end cover. In general, because the temperature of the cooling fins becomes high, the temperature of the end cover facing the cooling fins is also increased. Although the end cover made of resin has a large thermal expansion coefficient, because a part in the end cover (hereinafter, referred to as "the rib-part adjacent part in the end cover"), which faces the rib part of the cooling fin projecting toward the end cover, is more close to the cooling fin than another part of the end cover (hereinafter, referred to as "the plate-part adjacent part of the end cover"), which faces the plate part of the cooling fin, the temperature of the rib-part adjacent part of the end cover is higher than that of the plate-part adjacent part of the end cover. As a result, a difference in thermal expansion coefficient between the rib-part adjacent part and the plate-part adjacent part of the end cover generates locally a thermal stress (a stress by a thermal expansion) at a boundary part between each part of the end cover, for example, a boundary part between the rib-part adjacent part in the end cover and the plate-part adjacent part of the end cover. Because such a thermal stress occurs repeatedly every becoming a high temperature of the cooling fins, the durability of the end cover decreases.

Although a separation of the end cover from the cooling fins in the rectifier device can reduce such a problem, the size of the AC generator for a vehicle (or the vehicular generator) increases instead. In addition, although using a thicker end cover can increase its mechanical stress resistance, a total amount of resin is thereby increased. This increases a manufacturing cost.

SUMMARY OF THE INVENTION

It is an object of the present invention to provide an AC generator for a vehicle equipped with an end cover of a high durability without increasing the size of the AC generator and without increasing the amount of resin. To achieve the above purposes, the present invention provides an AC generator for a vehicle has a frame and an end cover. The frame accommodates a rotor and a stator. The end cover is made of mold resin. The end cover is fixed to the frame and accommodates electrical components including a rectifier device. The rectifier device is capable of rectifying an output voltage of a stator coil of the stator which is fixed to an outer end surface of the frame. The rectifier device has a flat plate part extending approximately in a radius direction, a rib part projecting from the plate part toward the end cover, and a cooling fin part facing the end cover. In the AC generator, the end cover has a first part which is close to the rib part of the rectifier device and a second part which is close to the flat plate part and away from the rib part. The first part is stronger in anti-thermal stress than the second part. The rib part in the AC generator of such a type increases a discharging area of the cooling fin and also increases the rigidity of the cooling fin. In particular, in the AC generator for a vehicle according to the present invention, the first part (corresponding to "the rib-part adjacent part" in the embodiments, which is mostly close to the rib part of the rectifier device) is thinner in thickness than the second part of the end cover.

The first part of the end cover and the second part (corresponding to "the flat plate-part adjacent part" in the embodiments) of the end cover are thermally expanded by the thermal energy from the cooling fin of the rectifier device of a high temperature. This thermal expansion of the end cover is generated in the radius direction and the axial direction of the AC generator (or the thickness direction of the end cover).

The thermal expansion in the radius direction of the end cover increases the radius of the end cover. The magnitude of this expanding force generated by the thermal expansion in the radial direction is increased according to the increase of thickness of each part of the end cover because it requires a large amount of resin. Further, the thermal expansion of the end cover in the axial direction increases the thickness of the end cover. Like the thermal expansion of the end cover in the radius direction, the magnitude of the expanding force generated by the thermal expansion in the axial direction is increased according to the increase of thickness of each part of the end cover because it requires a large amount of resin. Still further, the force of the thermal expansion is increased in the end cover according to the increase of the temperature.

The end cover in the AC generator according to the present invention is so formed that the first part in the end cover, which is close to the rib part of the rectifier device, is stronger in anti-thermal stress than the second part which is close to the flat plate part and away from the rib part. In more concrete examples, the end cover is so formed that the first part, which becomes a higher temperature than the second part, is thinner in thickness than the second part. This configuration enables that the thermal expansion of the first part and the thermal expansion of the second part can be balanced in the entire of the rear cover. This means that although the thermal expansion of the first part per weight is relatively larger than that of the second part, the total amount of resin in the first part is relatively small than that of the second part. According to the present invention, the variation of the thermal stress in the parts of the end cover can reduced and the durability of the end cover can be extended or increased without increasing the total amount of resin of the end cover and without increasing the gap between the end cover and the cooling fin of the rectifier device.

In the AC generator for a vehicle as another aspect of the present invention, the inner surface of the first part (corresponding to "the rib-part adjacent part" in the embodiments) in the end cover, which faces the rib part of the cooling fin in the rectifier device, is curved toward the outside of the end cover so that the first part of the end cover is a concave part which is thinner in thickness than the second part (corresponding to "the plate-part adjacent part" in the embodiments). This configuration enables the first part (the rib-part adjacent part) of the end cover to be away from the rib part of the rectifier device without increasing a gap between the cooling fin of the rectifier device and the end cover. It is thereby possible to decrease the magnitude of the thermal stress to the first part (the rib-part adjacent part) and also to reduce the variation of the thermal stress applied to each part of the end cover. It is preferred to radially form the second part (the plate-part adjacent part) of the end cover corresponding to the shape of the rib part of the rectifier device. This configuration can prevent the deterioration of rigidity of the end cover in the axial direction which is caused by the first part of a thinner thickness.

In the AC generator for a vehicle as another aspect of the present invention, the surface of the first part of the end cover, which faces the rib part of the cooling fin of the rectifier device, is concave in an outward axial direction when compared with the surface of the second part of the end cover which faces the flat plate part of the cooling fin of the rectifier device. Because this configuration can decrease the difference between the gap of the first part to the rib part and the gap of the second part to the flat plate part in the axial direction, it is possible to reduce the variation of the thermal expansion between the first part and the second part of the end cover.

In the AC generator for a vehicle as another aspect of the present invention, the first part of the end cover facing the rib part of the cooling fin of the rectifier device is out-curved toward the outside of the end cover. Because this configuration does not require the first part of a thinner thickness, it is possible to prevent the decrease of the rigidity of the end cover.

In the AC generator for a vehicle as another aspect of the present invention, a plurality of cooling air suction windows are formed in the first part of the end cover which faces the rib part of the cooling fin of the rectifier device, and each cooling air suction window is open along the rib part of the cooling fin of the rectifier device. Because there is no part of the end cover in the configuration facing the rib part, the entire of the end cover has a uniform temperature distribution and it is possible to prevent the variation of the thermal stress in the end cover. In addition, this configuration can decrease the gap between the rib part of the cooling fin of the rectifier device and the end cover, and can avoid the occurrence of vibrating the end cover by the vibration of the rib part. Still further, because the presence of the rib part can compress the cooling air which is sucked through the opening part of each cooling air suction window of the end cover and thereby increase the flow speed of the cooling air, it is possible to efficiently cool the rib part and the plate part of the cooling fin of the rectifier device by the cooling air of the increased flowing speed.

In the AC generator for a vehicle as another aspect of the present invention, each cooling air suction window and the rib part are formed radially. This configuration can prevent the decrease of the rigidity of the end cover having the cooling air suction windows.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
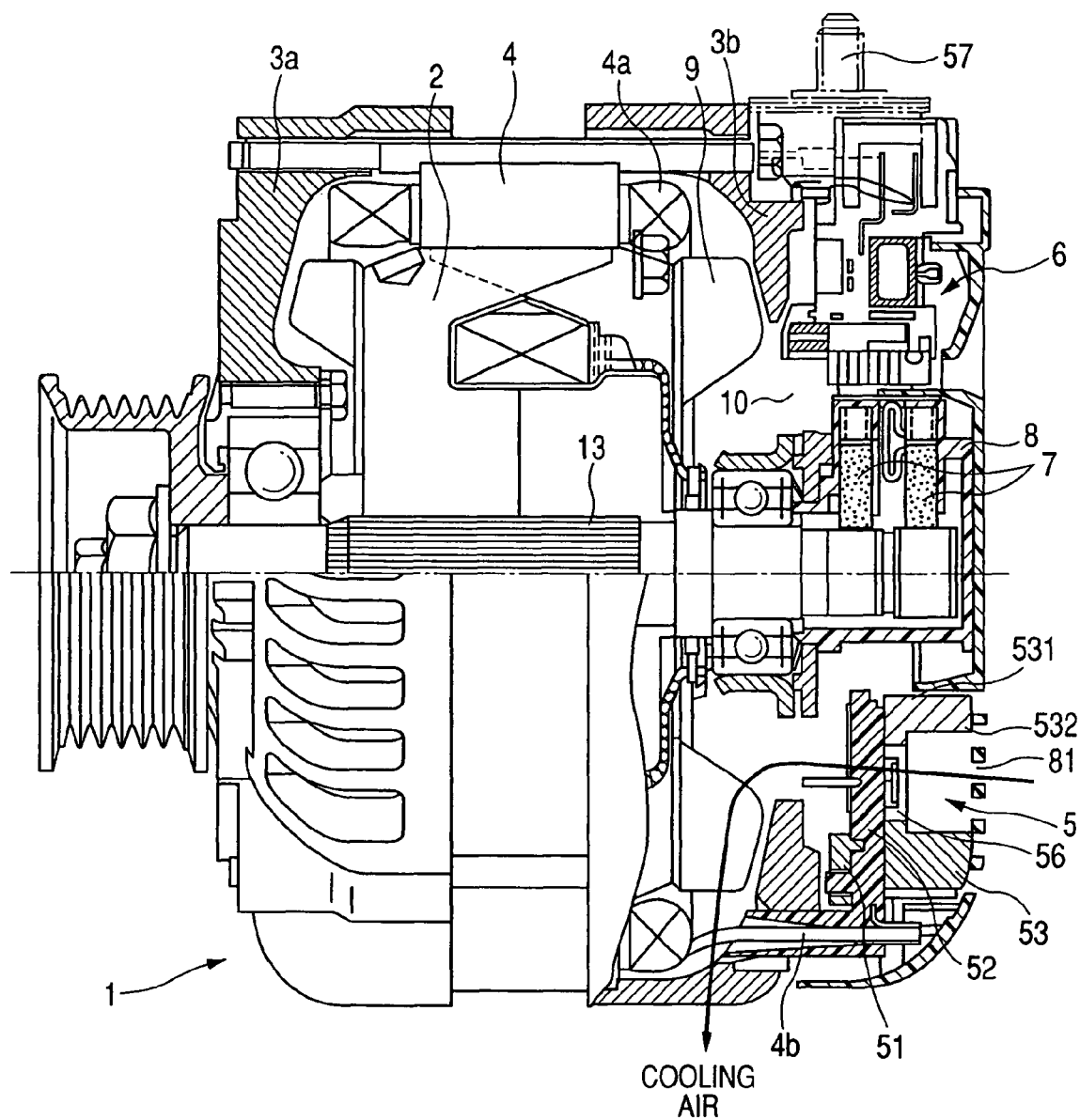
FIG. 1 is a cross sectional view of an AC generator for a vehicle along its axial direction according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will now be given of an AC generator for a vehicle (or a vehicular alternator) according to the first embodiment of the present invention with reference to FIG. 1 to FIG. 3.

(Entire Configuration)

Figure 2:
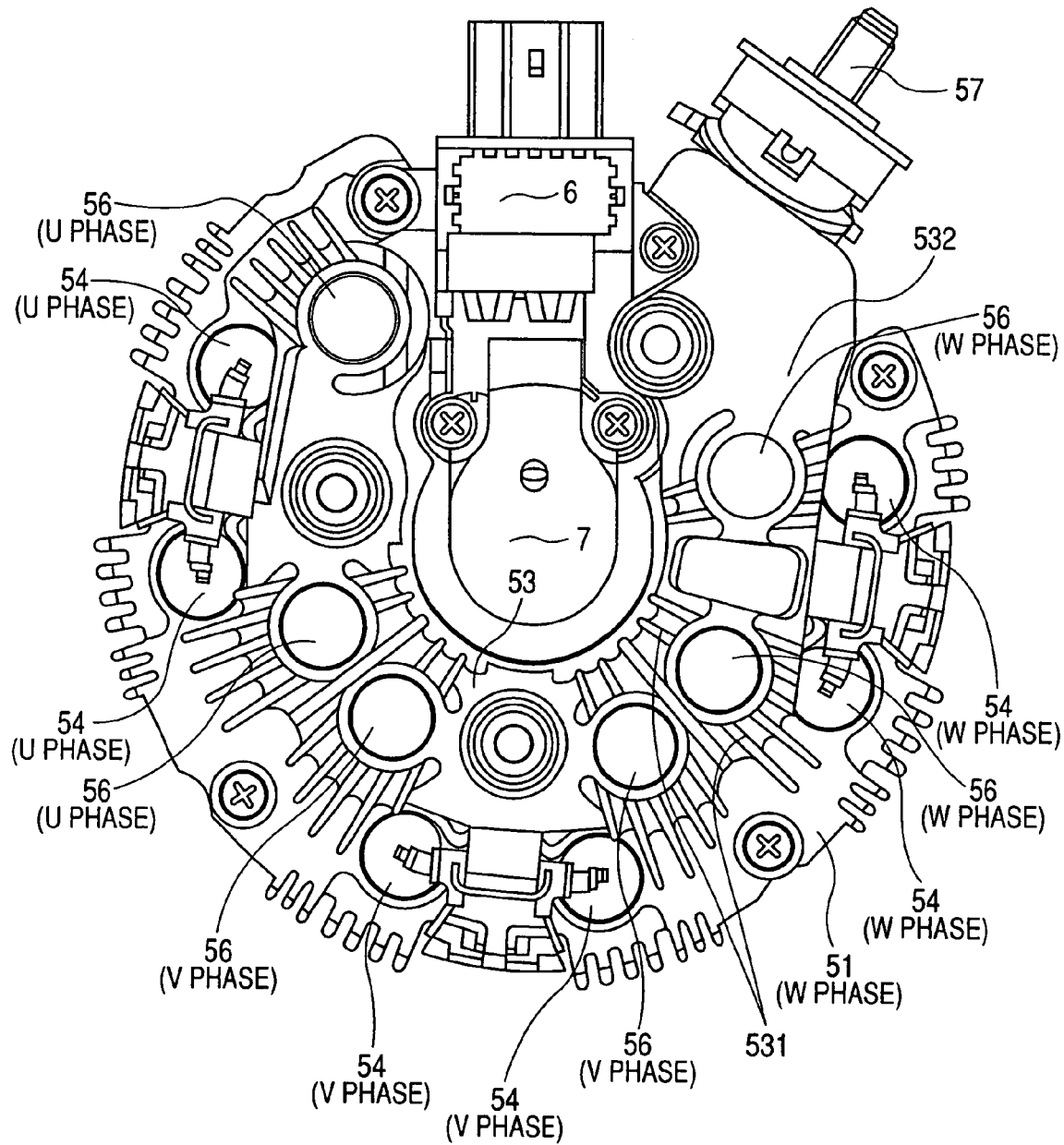
FIG. 2 is a plan view of the AC generator for a vehicle observed from its rear side according to the first embodiment shown in FIG. 1.

FIG. 1 is a cross sectional view of the AC generator for a vehicle along its axial direction according to the first embodiment of the present invention.

The AC generator 1 for a vehicle has a rotor 2, a front frame 3a, a rear frame 3b, a stator 4, a rectifier device 5, a regulator 6, and a brush assembly 7. The rotor 2 rotates by a rotary power transmitted from a vehicular engine (not shown) through a pulley and a belt (not shown). The front frame 3a and the rear frame 3b rotatably support the rotor 2 through bearings. The stator 4 accommodates the rotor 2 therein and is fixed to the front frame 3a and the rear frame 3b. The stator 4 has stator coils 4a in which an AC voltage is induced by a rotating magnetic field generated by rotating the rotor 2. The rectifier device 5 converts the AC power (or an alternating current power) supplied from the stator coil 4a to a DC power (or a direct current power). The regulator 6 adjusts the DC voltage rectified by the rectifier device 5 to a desired voltage. The brush assembly 7 supplies an exciting current to a field winding 2a of the rotor 2 through a slip ring.

A cup-shape end cover 8 covers the rectifier device 5, the regulator 6, and the brush assembly 7 fixed to the rear end wall of the rear frame 3b and is tightly fastened to the rear frame 3b. The end cover 8 is made of resin by molding. A cooling fan 9 is fixed to the end surface of the rotor 2. The cooling fan 9 rotates and forcedly supplies the cooling air, which is flowing into the front frame 3a and the rear frame 3b through the cooling air sucking window 10 of the rear frame 3b, toward the centrifugal direction of the cooling fan 9 or the axial direction in order to cool the stator coil 4a and other components. Because the AC generator for a vehicle has a well known configuration, the detailed explanation and actions are omitted here.

(Rectifier Device 5)

A description will now be given of the rectifier device 5 with reference to FIG. 1 and FIG. 2. FIG. 2 is a plan view of the AC generator for a vehicle observed from its rear side according to the first embodiment shown in FIG. 1. As shown in FIG. 1 and FIG. 2, the rectifier device 5 is composed mainly of a larger-diameter cooling fin 51 (or a large-diameter discharging fin) of negative electric potential which mounts positive rectifying elements, a smaller-diameter cooling fin 53 (or a small-diameter discharging fin) of positive electric potential which mounts positive rectifying elements, and a terminal plate 52. The larger-diameter cooling fin 51 and the smaller-diameter cooling fin 53 will be referred in short to as "the negative fin 51" and "the positive fin 53", respectively. The terminal plate 52 is made of resin in which metal chips for AC wirings are made by an insert-molding step.

The negative fin 51, the terminal plate 52, and the positive fin 53 are stacked and tightly fastened to the rear frame 3b so that the negative fin 51 is fixed to the rear frame 3b side and the positive fin 53 is fixed to the end cover 8 side. The positive fin 53 is electrically insulated from the rear frame 3b, and the negative fin 51. It is also possible to have an opposite configuration in which the negative fin 51 is fixed to the end cover 8 side and the positive fin 53 is fixed to the rear frame 3b side.

The negative fin 51 is electrically connected to diodes 54 in a negative pole of each phase (U, V, and W phases). The positive fin 53 is electrically connected to diodes 56 in a positive pole of each phase (U, V, and W phases).

A lead of a cathode electrode of each negative diode 54 and a lead of an anode electrode of each positive diode 54 are electrically connected to metal plates for wirings of each phase each (U, V, and W phases). Those metal plates project from the terminal plate 52. A stator lead 4b of the stator coil 4a for each phase (U, V, and W phases) is electrically connected to a metal plate for an AC wiring of each phase (U, V, and W phases). The negative fin 51 is grounded. The output terminal is fixed to the positive fin 53. The terminal plate 52 is placed between the negative fin 51 and the positive fin 53 in order to electrically insulate the negative fin 51 and the positive fin 53. The terminal plate 52 further fixes the metal plate for the AC wiring of each phase (U, V, and W phases).

In the first embodiment of the present invention, although the negative fin 51 and the positive fin 53 are formed by die casting using aluminum, it is possible to form them with a press. Each of the negative fin 51 and the positive fin 53 extends toward the radius direction. As shown in FIG. 2, the positive fin 53 is smaller in radius size than the negative fin 51.

The positive fin 53 is composed of flat plate parts 531 and rib parts 532, where the flat plate parts 531 extends toward the radius direction, and the plural rib parts 532 extend from the flat surface of the flat plate parts 531 at the end cover 8 side toward the end cover 8 side in the axial direction. Although each rib part 532 is formed in line shape, it is possible that each rib part 532 takes another shape. The rib part 532 is so formed that it is away from the positive diode 56 which are inserted in and fixed to the flat plate part 531 of the positive fin 53.

Figure 3:
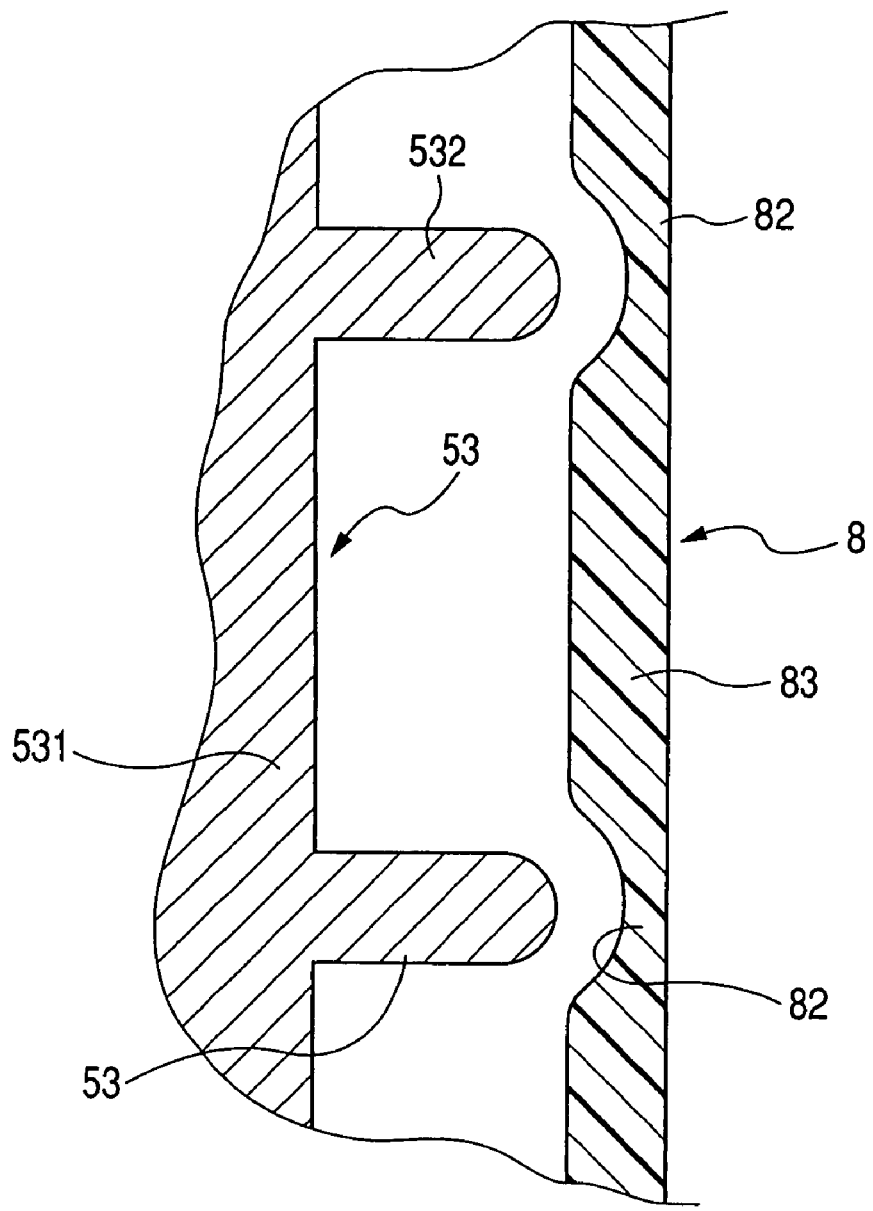
FIG. 3 is a partial sectional view of a cooling fin and an end cover along the axial direction of the AC generator according to the first embodiment shown in FIG. 1.

In the configuration of the AC generator for a vehicle according to the first embodiment of the present invention, the rib part 532 projects from the flat plate part 531 by approximately 10 mm toward the rear side of the AC generator in the axial direction, as shown in FIG. 3. The presence of the rib parts 532 can increase the discharging area without increasing the radius of the positive fin 53. The cooling air flows into the axial direction through each opening window of a cooling air flow sucking window 81 (see FIG. 1), and then flows into both directions, an outer-radius direction and an inner-radius direction by the rib part 532 while cooling the rib parts 532. That is, because the flow of the cooling air is adjusted by the rib parts 532 of the rectifier device 5, a fluid loss thereof can be decreased. The cooling air also flows in the radius direction through a gap between a circumferential wall part of the end cover 8 and an outer peripheral edge of the front frame 3a.

(End Cover 8)

The end cover 8 of a cup shape is formed by resin molding and has a plurality of opening windows of the cooling air sucking window 81.

FIG. 3 is a partial sectional view of the cooling fins and the end cover 8 along the axial direction of the AC generator according to the first embodiment shown in FIG. 1.

A description will now be given of the feature of the end cover 8 in the AC generator for a vehicle with reference to FIG. 3.

As shown in FIG. 3, a rib-part adjacent part 82 in the end cover 8, which is close to the rib part 532 of the positive fin 53, has a thinner concave shape which is thinner than the other part of the end cover 8. A plate-part adjacent part 83 in the end cover 8 is away from the rib part 532 of and close to the flat plate part of the positive fin 53 when compared with the rib-part adjacent part 82. This configuration can decrease the variation of thermal stress which is different in the rib-part adjacent part 82 and the plate-part adjacent part 83, and thereby can increase the anti-thermal fatigue of the end cover 8. The rib-part adjacent part 82 corresponds to "the first part" defined in claims of the present invention. The plate-part adjacent part 83 corresponds to "the second part" defined in claims of the present invention.

Second Embodiment

Figure 4:
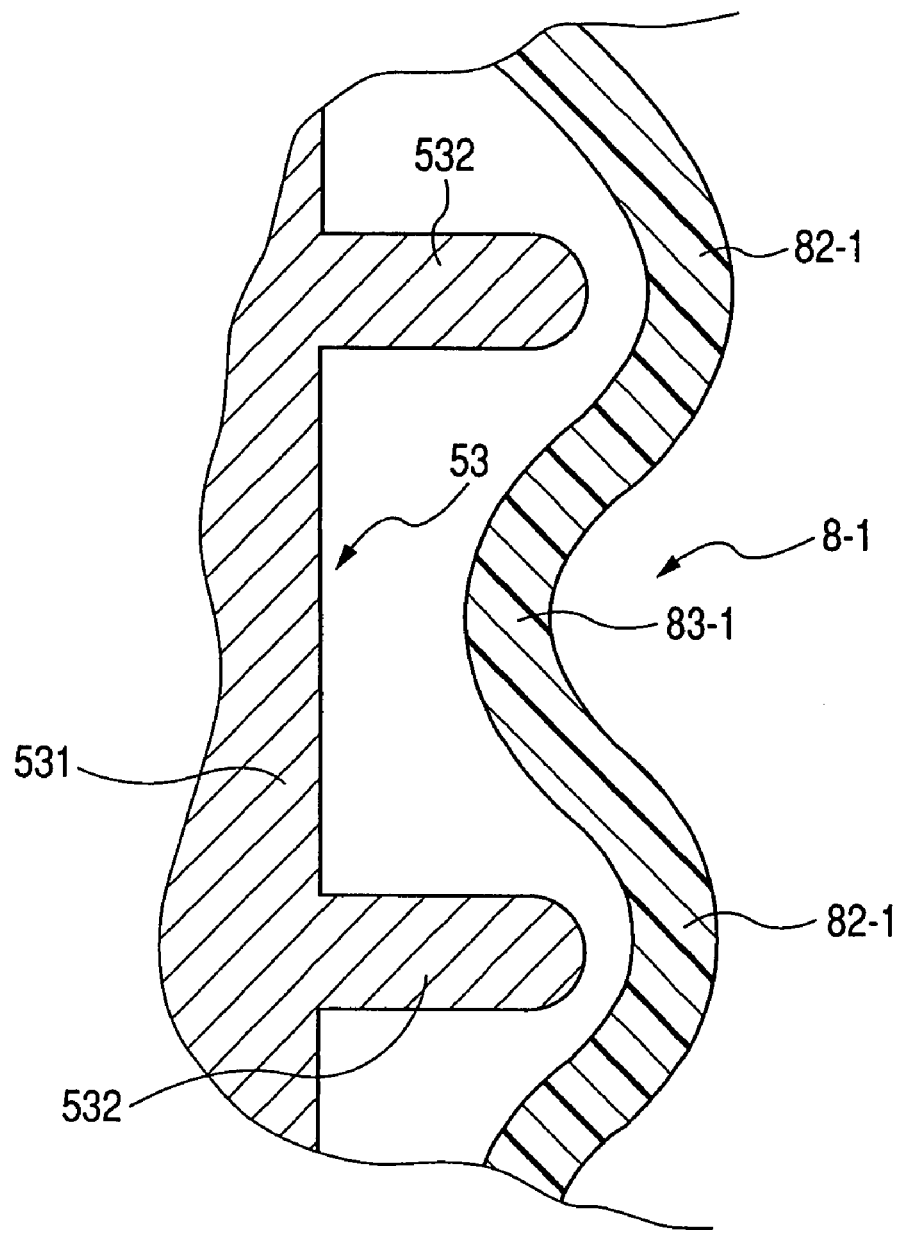
FIG. 4 is a partial sectional view of the cooling fin and the end cover along the axial direction of an AC generator for a vehicle according to a second embodiment of the present invention.

A description will now be given of an AC generator for a vehicle according to a second embodiment of the present invention with reference to FIG. 4. FIG. 4 is a partial sectional view of the positive fins 53 (or a cooling fin) and the end cover 8-1 along the axial direction of the AC generator for a vehicle according to the second embodiment.

The end cover 8-1 of the AC generator according to the second embodiment shown in FIG. 4 is different in configuration from the end cover 8 of the AC generator according to the first embodiment shown in FIG. 3.

As shown in FIG. 4, the rib-part adjacent part 82-1 in the end cover 8-1, which is close to the rib part 532 of the positive fin 53, is curved toward the outside of the end cover 8-1 when compared with the plate-part adjacent part 83-1 which is away from the rib part 532.

This configuration shown in FIG. 4 can also decrease the variation of thermal stress which is different in the rib-part adjacent part 82-1 and the plate-part adjacent part 83-1 in the end cover 8-1, and thereby can increase the anti-thermal fatigue of the end cover 8-1.

Third Embodiment

Figure 5:
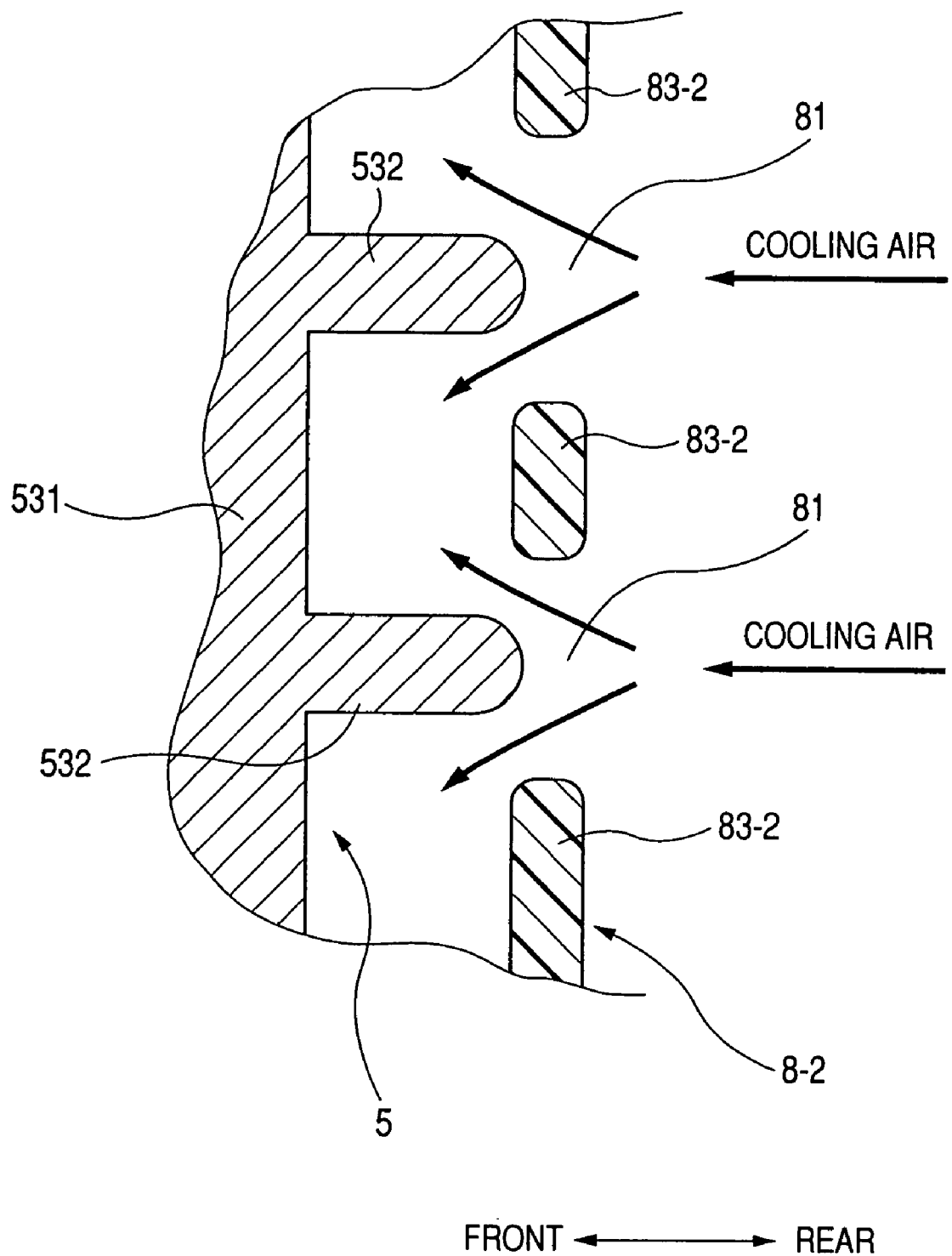
FIG. 5 is a partial sectional view of the cooling fin and the end cover along the axial direction of an AC generator for a vehicle according to a third embodiment of the present invention.

A description will now be given of an AC generator for a vehicle according to a third embodiment of the present invention with reference to FIG. 5. FIG. 5 is a partial sectional view of the positive fin 53 and the end cover 8-2 along the axial direction of an AC generator for a vehicle according to the third embodiment.

In the configuration of the end cover 8-2 according to the third embodiment, each rib-part adjacent part becomes each opening window of the cooling air flow sucking window 81 (see FIG. 1 and FIG. 5). The plate-part adjacent part 83-2 corresponds to the plate-part adjacent part 83 shown in FIG. 3. This configuration shown in FIG. 5 can also decrease the variation of thermal stress which is different in the rib-part adjacent part and the plate-part adjacent part 83-2 in the end cover 8-2, and thereby can increase the anti-thermal fatigue.

Because each rib part 532 is formed in a radial pattern, the cooling air flow sucking window 81 has each opening window which is a penetration groove of a line shape extending radially. As shown in FIG. 5, the cooling air flow sucking window 81 is formed corresponding to the rib part 532 in the axial direction of the AC generator.

This configuration can efficiently eliminate deterioration of the end cover 8-2 caused by the variation of the thermal stress in the end cover 8-2 because each part in the end cover 8-2, which is close to the positive fin 53, becomes each opening window of the cooling air flow sucking window 81. Further, the configuration of the second embodiment shown in FIG. 5 enables the rib part 532 in the positive fin 53 to be placed mostly closed to the end cover 8-2. Still further, the configuration of the second embodiment enables the cooling air flowing through the cooling air flow sucking window 81 to efficiently cool the rib part 532.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An AC generator for a vehicle comprising:
   a frame accommodating a rotor and a stator; and
   an end cover made of mold resin, which is fixed to the frame, accommodating electrical components including a rectifier device capable of rectifying an output voltage of a stator coil of the stator fixed to an outer end surface of the frame, the rectifier device comprising a flat plate part extending approximately in a radius direction, a rib part projecting from the plate part toward the end cover, and a cooling fin part facing the end cover,
   wherein the end cover has a first part which is close to the rib part of the rectifier device and a second part which is close to the flat plate part and away from the rib part, and the first part is stronger in anti-thermal stress than the second part,
   the first part which is close to the rib part of the rectifier device is thinner in thickness than the second part, and
   the inner surface of the first part in the end cover, which faces the rib part of the cooling fin in the rectifier device, is curved toward the outside of the end cover so that the first part of the end cover is a concave part which is thinner in thickness than the second part.

2. The AC generator for a vehicle according to claim 1, wherein a plurality of cooling air suction windows are formed in the first part of the end cover which faces the rib part of the cooling fin of the rectifier device, and each cooling air suction window is open along the rib part of the cooling fin of the rectifier device.

3. An AC generator for a vehicle comprising:
   a frame accommodating a rotor and a stator; and
   an end cover made of mold resin, which is fixed to the frame, accommodating electrical components including a rectifier device capable of rectifying an output voltage of a stator coil of the stator fixed to an outer end surface of the frame, the rectifier device comprising a flat plate part extending approximately in a radius direction, a rib part projecting from the plate part toward the end cover, and a cooling fin part facing the end cover,
   wherein the end cover has a first part which is close to the rib part of the rectifier device and a second part which is close to the flat plate part and away from the rib part, and the first part is stronger in anti-thermal stress than the second part, and
   the surface of the first part of the end cover, which faces the rib part of the cooling fin of the rectifier device, is concave in an outward axial direction when compared with the surface of the second part of the end cover which faces the flat plate part of the cooling fin of the rectifier device.

4. The AC generator for a vehicle according to claim 3, wherein the first part of the end cover facing the rib part of the cooling fin of the rectifier device is out-curved toward the outside of the end cover.

5. The AC generator for a vehicle according to claim 4, wherein each cooling air suction window and the rib part are formed radially.

6. The AC generator for a vehicle according to claim 3, wherein a plurality of cooling air suction windows are formed in the first part of the end cover which faces the rib part of the cooling fin of the rectifier device, and each cooling air suction window is open along the rib part of the cooling fin of the rectifier device.

* * * * *